(12) United States Patent
Yamamoto et al.

(10) Patent No.: US 7,412,223 B1
(45) Date of Patent: Aug. 12, 2008

(54) MOBILE COMMUNICATION TERMINAL (75) Inventors: Masaaki Yamamoto, Yokohama (JP); Yuko Watanabe, Ise (JP); Kouji Chiba, Yokohama (JP); Masaharu Nakatsuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/720,729

(22) PCT Filed: May 15, 2000

(86) PCT No.: PCT/JP00/03105

§ 371 (c)(1),
(2), (4) Date: Dec. 28, 2000

(87) PCT Pub. No.: WO00/70794

PCT Pub. Date: Nov. 23, 2000

(30) Foreign Application Priority Data

May 14, 1999 (JP) .................................. 11-134895

(51) Int. Cl.
H04Q 7/20 (2006.01)
(52) U.S. Cl. ................. 455/403; 455/412.1; 455/435.1; 455/550.1; 455/566
(58) Field of Classification Search ................. 455/420, 455/403, 566, 412.1, 412.2, 466, 550.1, 418, 455/41, 435.1
See application file for complete search history.

(56) References Cited

U.S. PATENT DOCUMENTS

| | | | |
|---|---|---|---|
| 5,809,433 A * | 9/1998 | Thompson et al. ........ | 455/575.7 |
| 5,870,683 A * | 2/1999 | Wells et al. .................. | 455/566 |
| 5,966,663 A * | 10/1999 | Gleason ....................... | 455/466 |
| 6,044,250 A * | 3/2000 | Kuramatsu et al. ........... | 340/7.4 |
| 6,134,631 A * | 10/2000 | Jennings, III ................ | 711/117 |
| 6,233,452 B1 * | 5/2001 | Nishino .................... | 455/435.2 |
| 6,327,482 B1 * | 12/2001 | Miyashita .................... | 455/566 |
| 6,349,203 B1 * | 2/2002 | Asaoka et al. ............ | 455/414.3 |
| 6,397,060 B1 * | 5/2002 | Oikawa ....................... | 455/420 |
| 6,470,076 B1 * | 10/2002 | Iwami ........................ | 379/67.1 |
| 6,473,609 B1 * | 10/2002 | Schwartz et al. ............ | 455/406 |
| 6,473,628 B1 * | 10/2002 | Kuno et al. .................. | 455/566 |
| 6,490,465 B1 * | 12/2002 | Mittelstadt et al. .......... | 455/566 |
| 6,650,889 B1 * | 11/2003 | Evans et al. .............. | 455/412.1 |

(Continued)

FOREIGN PATENT DOCUMENTS

EP 646 856 A2 4/1995

(Continued)

OTHER PUBLICATIONS

Patent Abstracts of Japan vol. 013, No. 212 (p. 873) May 18, 1989 & JP 1-28762 A (NEC Corp; Others : 01) Jan. 31, 1989.

(Continued)

Primary Examiner—Nghi H Ly
(74) Attorney, Agent, or Firm—Brinks Hofer Gilson & Lione (57) ABSTRACT

A transmission-reception device receives site screen data transmitted from an IP server. An SRAM records the site screen data received by the transmission-reception device. When in a reception standby state, the CPU reads the site screen data recorded in the SRAM, generates a site screen, and displays this on the liquid crystal display.

20 Claims, 10 Drawing Sheets

U.S. PATENT DOCUMENTS 7,024,557 B1 *   4/2006   Moles et al. ................ 713/170

FOREIGN PATENT DOCUMENTS

| EP | 0 677 949 | A2 | 10/1995 |
| EP | 0 814 442 | A2 | 6/1997 |
| EP | 779 759 | A2 | 6/1997 |
| EP | 0 814 442 | A3 | 9/1997 |
| EP | 0 864 963 | A2 | 9/1998 |
| EP | 0 889 402 | A2 | 1/1999 |
| JP | 64-28762 | A | 1/1989 |
| JP | 6-202864 | A | 7/1994 |
| JP | H06-506575 | A | 7/1994 |
| JP | H07-271865 | A | 10/1995 |
| JP | 11-18145 | A | 1/1999 |
| JP | H11-041643 | | 2/1999 |
| JP | 11-122648 | A | 4/1999 |
| JP | H11-112634 | | 4/1999 |
| JP | H11-210165 | A | 8/1999 |
| KR | 98-7055 | | 3/1998 |
| KR | 1999-013413 | | 2/1999 |
| WO | WO 92/19078 | | 10/1992 |
| WO | WO 92/19078 | A1 | 10/1992 |
| WO | WO 97/37502 | | 10/1997 |
| WO | WO 98/27778 | | 6/1998 |
| WO | WO 98/33312 | | 7/1998 |
| WO | WO 99/13661 | | 3/1999 |

OTHER PUBLICATIONS

Norse Office Action dated Mar. 27, 2006.

* cited by examiner

MOBILE COMMUNICATION TERMINAL

TECHNICAL FIELD

The present invention relates to a mobile communication terminal such as, for example, a portable telephone.

BACKGROUND ART

Mobile communication terminals, such as portable telephones, display a reception standby screen on a liquid crystal display when in the state of waiting to receive a call (hereafter referred to as a reception standby state).

This reception standby screen is displayed based on data stored in a memory inside the mobile communication terminal. However, the types of reception standby screens are restricted to those prestored in the memory upon shipping of the product. Thus, the user may lack interest in reception standby screens.

DISCLOSURE OF THE INVENTION

The present invention has the purpose of enabling users of a mobile communication terminal to easily customize the images displayed at the display portion as reception standby screens or the like.

In order to achieve this purpose, the mobile communication terminal of the present invention comprises a communication portion for accessing a server network through the mobile communication network, using a radio channel and for downloading site screen data from the server and a display portion for displaying the downloaded site screen data. The mobile communication terminal of the present invention further comprises a recording portion for recording the site screen data in a non-volatile memory, and a display control portion for reading from the non-volatile memory the site screen data recorded by the recording portion and displaying it on the display portion.

This site screen data may include image data.

More preferably, the display control portion may display the site screen data on the display portion as a reception standby screen when the mobile communication terminal is in a reception standby state, or may display the site screen data on the display portion as a downloading screen when the mobile communication terminal is downloading data from a server network through the mobile communication network.

Furthermore, the display control portion may display the site screen data so as to fit the size of a display region of the display portion, or may generate a repeating pattern of the site screen data to display on the display portion.

Preferably, the mobile communication terminal of the present invention further comprises a recordability determining portion for determining whether or not the site screen data may be recorded by the recording portion.

The recordability determining portion may perform the determination by referring to copyright information appended to the site screen data, or may perform the determination by referring to data size information appended to the site screen data.

More preferably, the mobile communication terminal of the present invention comprises a connecting portion for connecting a memory medium for storing communication setting information needed for communications through the mobile communication network and a readout portion for reading the communication setting information from the memory medium. The communication portion downloads predetermined information appended to the site screen data along with the data by accessing the server based on the read communication setting information. The recordability determining portion performs the determination by referring to the predetermined information appended to the downloaded site screen data and the communication setting information.

Alternatively, the mobile communication terminal of the present invention comprises a connecting portion for connecting to a memory medium storing communication setting information needed for communications through the mobile communication network and a key for decrypting the site screen data which has been encrypted. The mobile communication of the present invention further comprises a readout portion for reading the communication setting information and the key from the memory medium. The communication portion downloads the site screen data which has been encrypted, by accessing the server based on the read communication setting information. The recordability determining portion performs a determination according to whether or not a key to decrypt the downloaded site screen data is stored in the memory medium.

Furthermore, the mobile communication terminal of the present invention may be such that the recording portion records a plurality of types of site screen data downloaded by the communication portion in the non-volatile memory. The mobile communication terminal of the present invention comprises a selecting portion for selecting the site screen data to be displayed on the display portion from among the plurality of types of site screen data which are recorded. The display control portion reads the site screen data selected by the selecting portion from the non-volatile memory and displays it on the display portion.

Moreover, the mobile communication terminal may be a portable telephone device.

The mobile communication terminal according to the present invention comprises: a communication portion for receiving through a radio channel image data sent from a second terminal device connected to a network through the mobile communication network; a recording portion for recording the received image data in a non-volatile memory; a display portion for displaying a reception standby screen; and a display control portion for reading from the non-volatile memory the image data recorded by the recording portion and for displaying it on the display portion as a reception standby screen.

The mobile communication terminal according to the present invention comprises: a communication portion for receiving through a radio channel image data sent from a second terminal device connected to a network through the mobile communication network; a recording portion for recording the received image data in a non-volatile memory; a display portion for displaying a data downloading screen; and a display control portion for reading the image data recorded by the recording portion from the non-volatile memory and displaying it on the display portion as a downloading screen.

The display control portion may display the image data so as to fit the size of a display region of the display portion, or may generate a repeating pattern of the image data to display on the display portion.

Preferably, the mobile communication terminal of the present invention comprises a recordability determining portion for determining whether or not the image data may be recorded by the recording portion.

The recordability determining portion may perform the determination by referring to copyright information appended to the image data, or may perform the determination by referring to data size information appended to the image data.

More preferably, the mobile communication terminal of the present invention comprises a connecting portion for connecting to a memory medium for storing communication setting information needed for communications through the mobile communication network. The mobile communication terminal of the present invention further comprises a readout portion for reading the communication setting information from the memory medium. The communication portion downloads predetermined information appended to the image data along with the data sent from the second communication terminal based on the communication setting information. The recordability determining portion performs the determination by referring to the predetermined information appended to the downloaded image data, and the communication setting information.

More preferably, the mobile communication terminal of the present invention comprises a connecting portion for connecting a memory medium storing communication setting information needed for communications through the mobile communication network and a key for decrypting the image data which has been encrypted. The mobile communication terminal of the present invention further comprises a readout portion for reading the communication setting information and the key from the memory medium. The communication portion receives the image data which has been encrypted and sent from the second communication terminal based on the read communication setting information. The recordability determining portion performs the determination according to whether or not a key to decrypt the downloaded image data is stored in the memory medium.

More preferably, the recording portion records a plurality of types of the image data downloaded by the communication means in the non-volatile memory. The recording portion comprises a selecting portion for selecting the image data to be displayed on the display portion from among the plurality of types of image data which are recorded. The display control portion reads the image data selected by the selecting portion from the non-volatile memory and displays it on the display portion.

Additionally, the mobile communication terminal may be a portable telephone device.

DETAILED DESCRIPTION OF THE INVENTION

Preferred embodiments of the present invention shall be explained in detail hereinafter with reference to the attached drawings.

Figure 1:
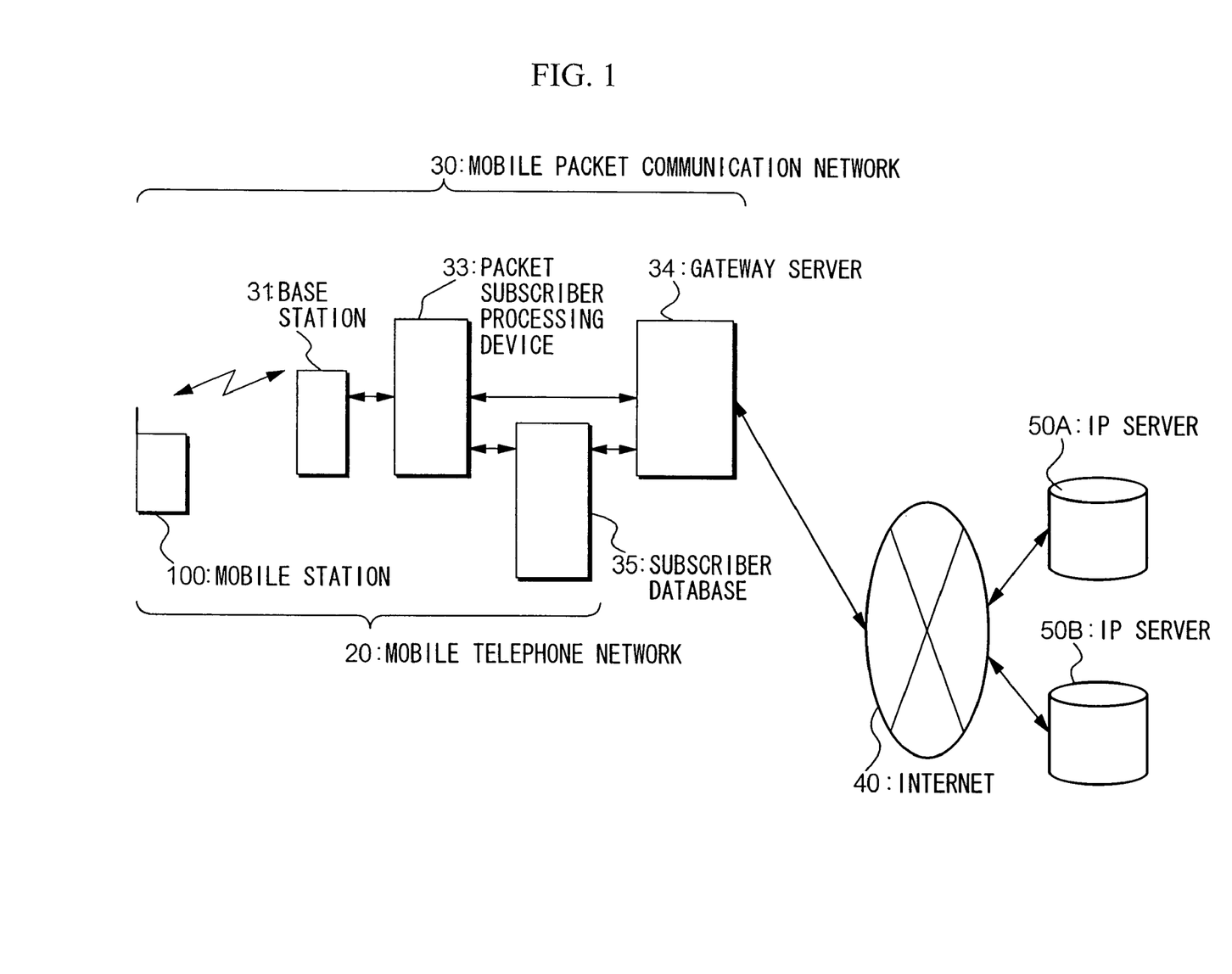
FIG. 1 is a block diagram showing the structure of a mobile communication system with a mobile station according to an embodiment of the present invention.

FIG. 1 is a diagram showing the overall structure of a mobile communication system with a mobile station according to an embodiment of the present invention.

This mobile communication system comprises a mobile station 100 (mobile communication terminal), a mobile telephone network 20, a mobile packet communication network 30, the Internet 40 and IP servers 50A, 50B. Hereinafter, the mobile packet communication network 30 and mobile telephone network 20 shall be referred to collectively as mobile communication networks. Additionally, the IP servers 50A, 50B shall be referred to as IP servers 50, aside from cases where it is necessary to specify one from the other.

The mobile station 100 is, for example, a portable telephone device capable of connecting to the mobile telephone network 20 and the mobile packet communication network 30. The structure of the mobile station 100 shall be described below.

The mobile telephone network 20 is a communication network for providing communication services to the mobile station 100. The mobile station 100 is capable of receiving calling services through the mobile telephone network 20, or the mobile telephone network 20 and a fixed telephone network, which is not shown.

The mobile telephone network 20 comprises a plurality of base stations 31 installed at predetermined intervals inside the communication area, a switching station (not shown) for performing circuit switching services, a control station (not shown) for controlling the network and a communication line (not shown) connecting the respective stations.

The mobile packet communication network 30, aside from the above-mentioned base stations 31, switching station, control station and the like, also comprises a packet subscriber processing device 33, a gateway server 34, a subscriber database 35 and a communication line (not shown) connecting these.

The packet subscriber processing device 33 is a computer system within a packet subscriber switching station (not shown) serving a plurality of base stations 31. The packet subscriber processing device 33 receives packet switching requests from the mobile station 100 and relays packet switching within the mobile packet communication network 30.

The gateway server 34 is a computer system within a mobile packet gateway switching station (not shown) interconnecting the mobile packet communication network 30 with another network, such as the Internet 40. The gateway server 34 converts between the different protocols of a plurality of networks and intermediates data exchange between these networks. Specifically, the gateway server 34 intermediates data exchange between networks while converting between the transmission protocols of the mobile packet communication network 30 and TCP/IP, which is the standard communication protocol of the Internet 40.

The gateway server 34 also performs information distribution services, such as intermediating the transmission and reception of electronic mails and various types of data between the mobile station 100 and IP servers 50. In order to perform this service, the gateway server 34 comprises a memory having a memory area for mailboxes that stores the sent electronic mails. Inside these mailboxes, the addresses (hereinafter referred to as mailbox addresses) for storing electronic mails addressed to subscribers to the mobile packet communication service are defined for individual subscribers.

The subscriber database 35 stores registered information relating to the respective subscribers of the mobile packet communication network 30. This registered information may, for example, include the "telephone number" of the mobile station 100, and the subscriber's "name", "sex", "date of birth" and "mailbox address".

The IP server 50 is a server system operated by an IP (information provider). The IP server 50 stores site screen data of homepages or the like in HTML (HyperText Markup Language) as information to be provided to users.

The IP server 50 is connected to the gateway server 34 through the Internet 40, as shown in FIG. 1, or it can be connected to the gateway server 34 through a dedicated line. Or, the IP server 50 may be provided inside the gateway server 34.

Figure 2:
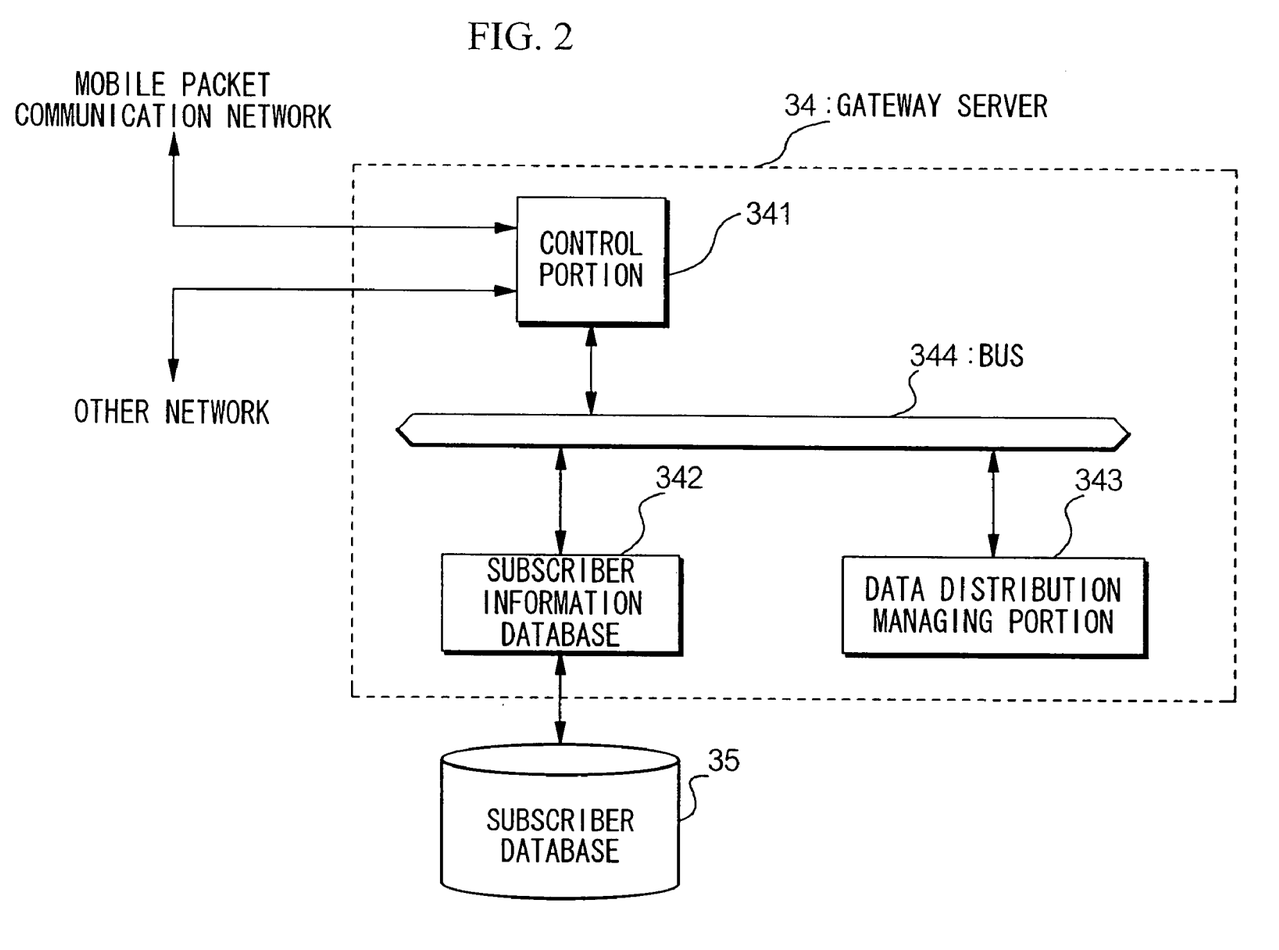
FIG. 2 is a block diagram showing the structure of a gateway server 34 in the same embodiment.

Next, the structure of the gateway server 34 shall be described in detail.

FIG. 2 is a block diagram showing the structure of the gateway server 34. As shown in the drawing, the gateway server 34 comprises a control portion 341, a subscriber information managing portion 342, a data distribution managing portion 343 and a bus 344 connecting these.

The control portion 341 controls various parts of the gateway server 34. The control portion 341 functions as an interface between networks, such as by converting protocols between the mobile packet communication network 30 and other networks, such as the Internet 40.

The subscriber information managing portion 342 stores registered information obtained by referencing the subscriber database 35.

The data distribution managing portion 343 comprises a memory having a memory area for the mailboxes as described above. The data distribution managing portion 343 also intermediates the transmission and reception of electronic mails and data between mobile stations 100, between the mobile station 100 and terminals (not shown) on the Internet 40, and between the mobile station 100 and the IP server 50.

The data distribution managing portion 343 also stores menu screen data for displaying menu items for types of services provided to the user of the mobile station 100, and transmits data in response to a request from the mobile station 100. The menu screen data is data in HTML format, such that each menu item is correlated with a URL (Uniform Resource Locator) of the IP server 50, which performs the service identified by that menu item.

When the user requests a specific service using the mobile station 100, the mobile station 100 sends the gateway server 34 the URL correlated with the menu item corresponding to that specific service. And, guided by the URL, the gateway server 34 accesses the IP server 50 which performs that specific service.

Figure 3:
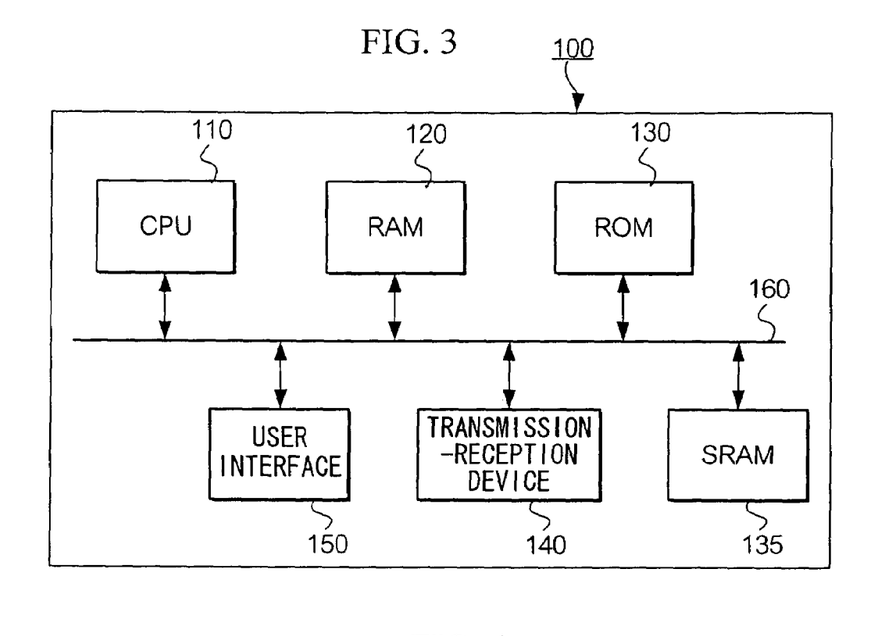
FIG. 3 is a block diagram showing the structure of a mobile station 100 in the same embodiment.

Next, the structure of the mobile station 100 shall be described.

FIG. 3 is a block diagram showing the structure of the mobile station 100. In this drawing, the mobile station 100 comprises a CPU 110 (display control portion, recording portion, recordability determining portion, selecting portion) for executing programs to control the entire mobile station 100, a RAM 120 used as a work area or the like for the CPU 110, a ROM 130 in which predetermined control programs or the like are stored, an SRAM 135 (non-volatile memory) for storing various types of screen data or the like, which remains non-volatile by power supplied from a backup power supply which is not shown, a transmission-reception device 140 (communication portion) for performing radio communications with a base station of the mobile communication network, a user interface 150 (display portion) including a liquid crystal display for displaying characters and images and a keypad for input operations, and a bus 160 for interconnecting these.

This mobile station 100 is capable of at least two types of mode settings including settings for a "calling mode" for making a call through the mobile telephone network 20, and a "packet communication mode" for performing packet communications through the mobile packet communication network 30.

In the packet communication mode, the mobile station 100 may transmits and receives electronic mails, and downloads data from the IP server 50.

The keypad of the user interface 150 comprises a key known as a "function button" (not shown). When a user pushes the function button, the mobile station 100 enters the packet communication mode by sending request signals to the mobile packet communication network 30, acquiring menu screen data by accessing the gateway server 34, and displaying this menu screen data on the liquid crystal display.

The ROM 130 stores various control programs which are executed by the CPU 110, such as programs relating to the calling function.

These control programs include programs for executing various routines described later, in addition to document data viewing software, known as a browser.

By reading and executing the browser from the ROM 130, the CPU 110 accesses the IP server 50 to acquire data in the HTML format (hereinafter referred to as HTML data). Specifically, the CPU 110 of the mobile station 100 transmits a data acquisition request designating a URL through the transmission-reception device 140 to the IP server 50, and stores the HTML data sent from the IP server 50 in the RAM 120. Furthermore, the CPU 110 interprets the HTML data stored in the RAM 120 and displays it on the liquid crystal display.

Figure 4:
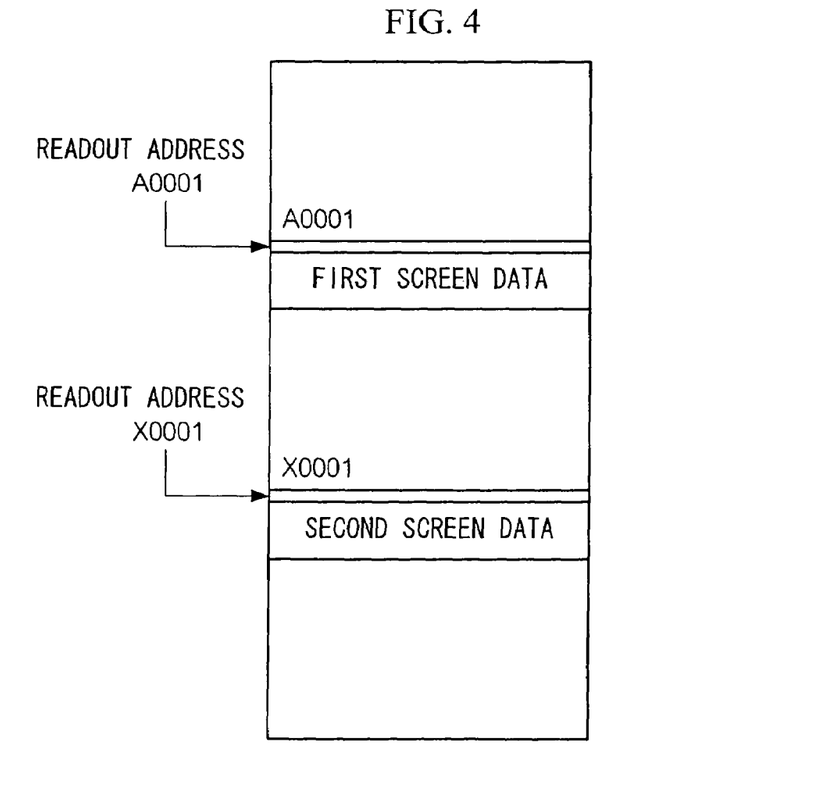
FIG. 4 is a diagram showing a memory map containing the memory contents of the SRAM 135 in the same embodiment.

Next, the structure of the aforementioned SRAM 135 shall be described.

FIG. 4 is a diagram showing a memory map indicating memory contents of the SRAM 135. In this drawing, prearranged default standby screen data is recorded as first screen data from the position of address "A0001" of the SRAM 135. Then, the initial readout address is set so that when the CPU 110 is to display the standby screen on the liquid crystal display, it refers to this address "A0001" to read out the first screen data.

Furthermore, in the SRAM 135, the site screen data downloaded from the IP server 50 is recorded from the position of address "X0001" as second screen data. This procedure of recording site screen data is initiated by selecting the "Register display screen" menu, which will be explained later.

When the second screen data is selected as a standby screen by a request from the user, the address "X0001" is reset as the readout address, instead of the previously mentioned address "A0001".

Data size information, indicating the size of the site screen data and copyright information (e.g., a specific code indicating a copyright) indicating that the content is copyright-protected and may not be copied without permission, is appended to the site screen data provided from the IP server 50.

By analyzing the data size information contained in the site screen data against the available capacity of the SRAM 135, the CPU 110 determines whether or not to record the site screen data in the SRAM 135. That is, if the SRAM 135 does not have an enough unused space to store data of the size indicated by the data size information, the CPU 110 determines that the site screen data is non-recordable.

Furthermore, the CPU 110 detects the presence or absence of copyright information in the site screen data, and determines whether or not to record the site screen data in the SRAM 135. That is, if copyright information is detected, the CPU 110 determines that the site screen data is non-recordable.

Hereinafter, the operations of the embodiment according to the above structure shall be explained with reference to FIGS. 5-10K.

Figure 5:
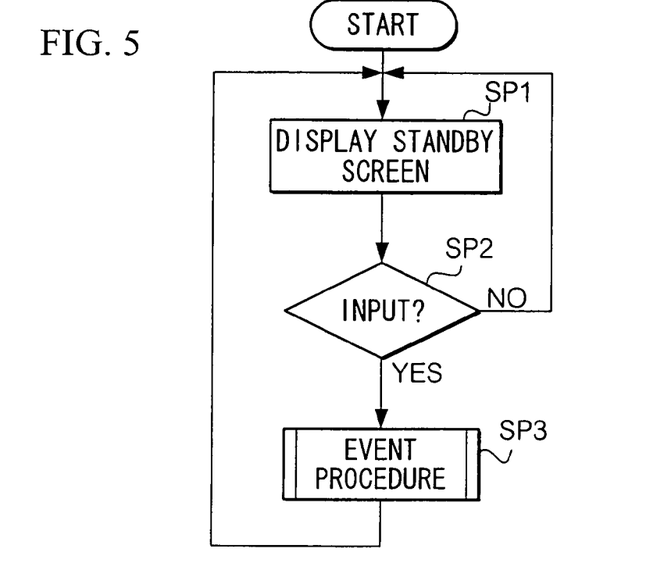
FIG. 5 is a flow chart of a main routine performed by the CPU 110 in the same embodiment.
Figure 6:
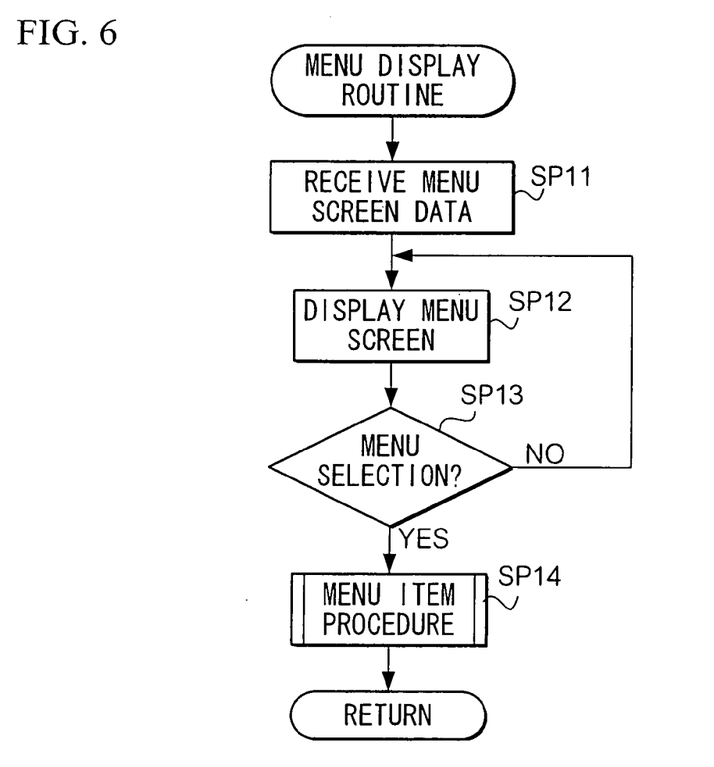
FIG. 6 is a flow chart of a menu display routine performed by the CPU 110 in the same embodiment.
Figure 7:
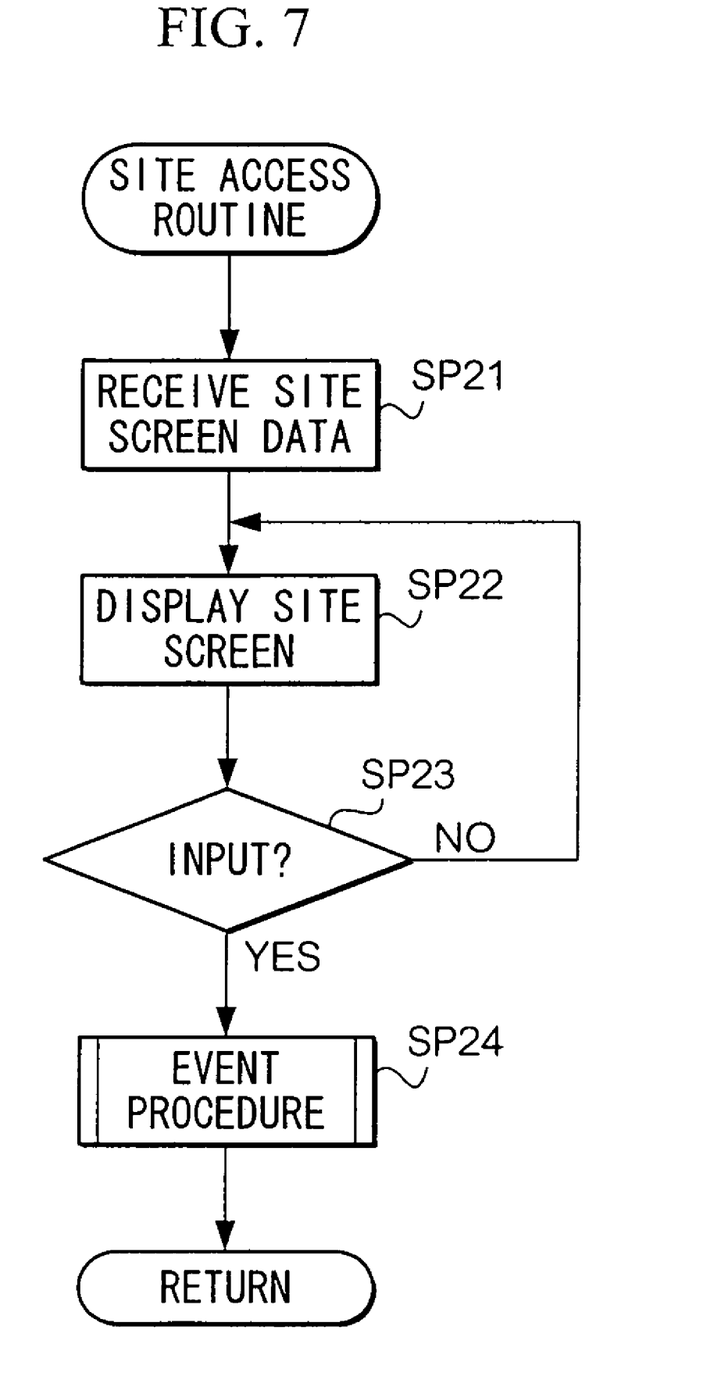
FIG. 7 is a flow chart of a site access routine performed by the CPU 110 in the same embodiment.
Figure 8:
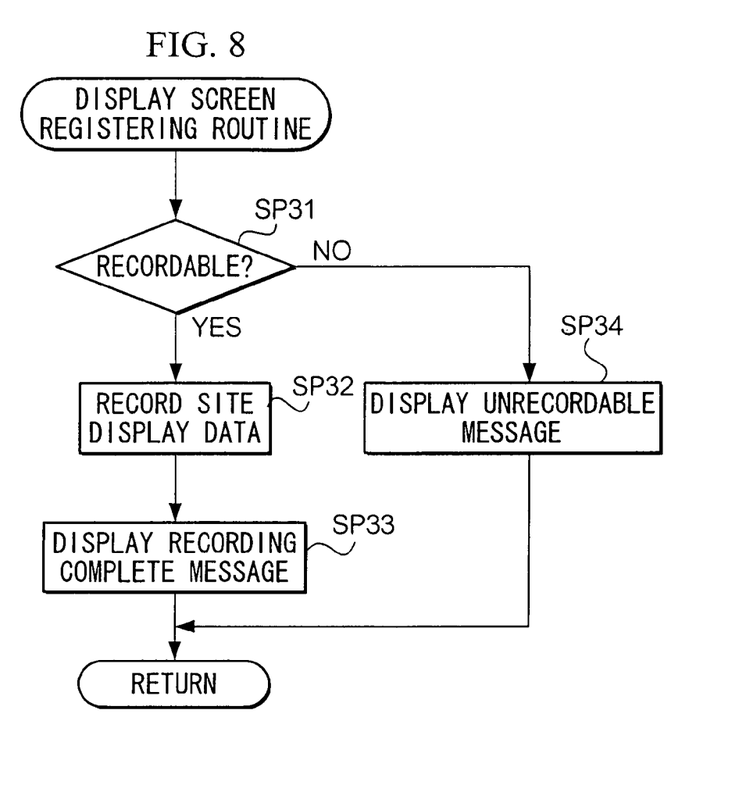
FIG. 8 is a flow chart of a display screen registration routine performed by the CPU 110 in the same embodiment.
Figure 9:
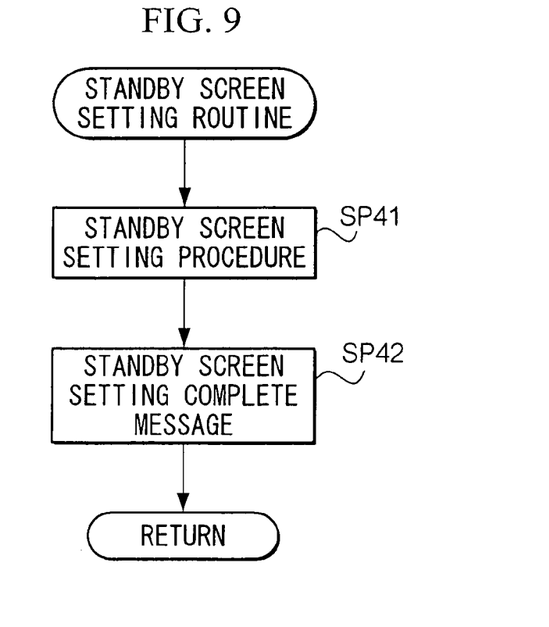
FIG. 9 is a flow chart of a standby screen setting routine performed by the CPU 110 in the same embodiment.
Figure 10:
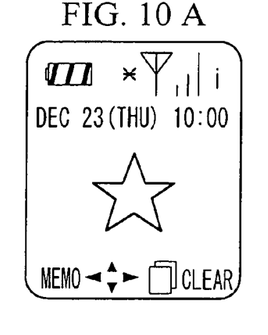
FIGS. 10A-10K are respectively diagrams showing screens displayed on a liquid crystal display during the performance of each routine in the same embodiment.

FIG. 5 is a flow chart showing the main routine executed by the CPU 110, FIG. 6 is a flow chart showing a menu display routine executed by the CPU 110, FIG. 7 is a flow chart showing a site access routine executed by the CPU 110, FIG. 8 is a flow chart showing a display screen registering routine executed by the CPU 110 and FIG. 9 is a flow chart showing a standby screen setting routine executed by the CPU 110.

FIGS. 10A-10K are diagrams which respectively show screens displayed on the liquid crystal display of the mobile station 100 during execution of the above routines.

First, when the power supply of the mobile station 100 is turned on, the CPU 110 reads the control program from the ROM 130, and activates the main routine shown in FIG. 5.

In step SP1, the CPU 110 reads first screen data from the address "A0001" of the SRAM 135 and displays it on the liquid crystal display as a standby screen. FIG. 10A is a diagram showing the standby screen displayed on the liquid crystal display at this time.

Then, in step SP2, the CPU 110 determines whether or not there has been an event, such as a user input or call arrival.

If the result of the determination is NO (i.e., if there is no event), then the CPU 110 repeats the standby screen display procedure of step SP1.

If the result of the determination is YES (i.e., if there is an event), the procedure advances to step SP3 and the CPU 110 executes a procedure corresponding to that event. The procedure corresponding to the event in step SP3 may, for example, be a procedure to be executed in the calling mode triggered by an outgoing call or incoming call, or a procedure to be executed in the packet communication mode triggered by a pressing of the function button.

Then, when the procedure corresponding to the event in step SP3 is completed, the procedure returns to step SP1 and the CPU 110 once again displays a standby screen on the liquid crystal display.

If the function button is pressed after the power supply is turned on, the CPU 110 activates the menu display routine shown in FIG. 6 at the aforementioned step SP3.

First, in step SP11, the CPU 110 sends a packet communication request signal through the transmission-reception device 140 to the mobile packet communication network 30. As a result, the mobile station 100 enters the packet communication mode and the gateway server 34 sends menu screen data.

In step SP12, the CPU 110 interprets the received menu screen data, and displays it on the liquid crystal display.

FIG. 10B is a diagram showing a menu screen displayed on the liquid crystal display at this time. As shown in the drawing, the menu items which are displayed include "(1) register display screen" for recording screen data displayed on the liquid crystal display in the SRAM 135, "(2) mobile banking" for performing online transactions with a financial institution, "(3) electronic mail" for performing electronic mail services, "(4) Internet" for access a site (such as the IP server 50) requested by the user by designating a URL, and "(5) set standby screen" for displaying the site screen data downloaded from the site such as the IP server 50 as the standby screen.

Referring again to FIG. 6 to explain the flow of operations, in step SP13, the CPU 110 determines whether or not the user has selected a specific menu item from among the menu items displayed on the liquid crystal display. The user may move a cursor on the liquid crystal display over a desired menu item by means of key operations, and perform a key operation to select that menu item.

Then, if the result of the determination is NO (i.e., if there is no menu selection), then the CPU 110 repeats the procedures of the menu screen display of step SP12.

If the result of the determination is YES (i.e., if there is a menu selection), the procedure advances to step SP14, and the CPU 110 performs a procedure corresponding to the selected menu item.

Once the procedure corresponding to the menu item is completed in step SP14, this menu display routine ends and the procedure returns to the aforementioned main routine.

For example, if in the aforementioned menu display state, the user selects the menu item "(4) Internet" and orders an access to a desired site, such as the IP server 50, the result of the determination in step SP13 becomes YES, and the procedure of the CPU 110 advances to step SP14.

Then, the CPU 110 activates the site access routine shown in FIG. 7.

First, in step SP21, the CPU 110 sends a URL designated by the user, to access the site corresponding to that URL through the gateway server 34 in order to receive the site screen data.

In step SP22, the CPU 110 interprets the received site screen data and displays it on the liquid crystal display. FIG. 10C is a diagram of a site screen displayed on the liquid crystal display at this time.

In step SP23, the CPU 110 determines whether or not there has been an event, such as an input operation by the user, while the site screen is being displayed.

If the result of the determination is NO, then the CPU 110 repeats the procedure of the site screen display of step SP22.

If the result of the determination is YES, then the procedure advances to step SP24, and the CPU executes a procedure corresponding to that event.

When the procedure corresponding to the event that occurred in step SP24 is completed, the site access routine ends and the procedure returns to the menu display routine described above.

In the site screen display state of step SP22 in FIG. 7, when a function button is pressed by the user, the determination result of step SP23 is YES, and the procedure advances to step SP24. Then, the CPU 110 stores the site screen data in a temporary waiting area of the RAM 120, and displays the menu screen shown in FIG. 10D.

If the user selects "(1) register display screen", the CPU 110 executes the display screen registration routine shown in FIG. 8.

In step SP31, the CPU 10 determines whether or not the temporarily stored site screen data is recordable. As mentioned above, the CPU 110 analyzes the data size information contained in the site screen data against the available space in the SRAM 135 to make this determination. Furthermore, the CPU 110 performs this process by detecting the presence or absence of copyright information in the site screen data.

If the result of this determination is YES (i.e., if recordable), then the procedure advances to step SP32, where the CPU 110 transfers the site screen data in the temporary waiting area in the RAM 120 to the SRAM 135 and records from the address "X0001". FIG. 10E is a diagram showing a screen displayed during the recording of the site screen data.

When this recording process is completed, the procedure advances to step SP33, and the CPU 110 displays a registration completion notification indicating on the liquid crystal display that registration of the display screen has been completed. FIG. 10F is a diagram showing a registration completion notification displayed at this time.

If the result of the determination in step SP31 is NO (i.e., non-recordable), then the procedure advances to step SP34, and the CPU 110 displays a non-recordability notification on the liquid crystal display. FIG. 10G is a diagram showing a non-recordability notification displayed at this time.

After performing these procedures, the procedures of the CPU 110 return to the main routine shown in FIG. 5.

If the function button is pressed in step SP2 of the main routine shown in FIG. 5, the menu display routing shown in FIG. 6 is executed, and the process returns once again to the menu screen display state shown in FIG. 10H. When "set standby screen" is selected by the user on this menu screen, the standby screen setting routine is activated in step SP14 of FIG. 6.

In step SP41 of the standby screen setting routine shown in FIG. 9, the CPU 110 performs the standby screen setting procedure described below. First, the CPU 110 displays on the liquid crystal display a screen for the user to select a display format for the standby screen.

FIG. 10I is a diagram showing a screen displayed on the liquid crystal display at this time.

As shown in the drawing, the display format for the standby screen includes "(1) center" and "(2) tile".

Figure 11:
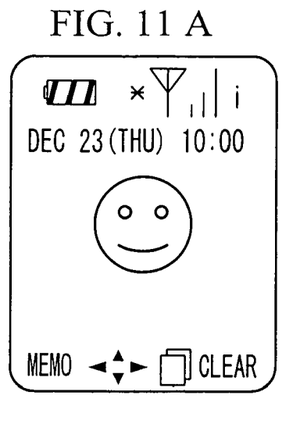
FIG. 11A is a diagram showing a specific display example of a central display after setting the standby screen in the same embodiment.
FIG. 11B is a diagram showing a specific display example of a full-screen display after setting the standby screen in the same embodiment.

"(1) Center" refers to a way of displaying the site screen data in which the site screen data recorded in the SRAM 135 is scaled according to the screen size of the liquid crystal display and displayed at the center of the display. Additionally, "(2) tile" refers to another way of displaying the screen data in which a repeating pattern of the site screen image data recorded in the SRAM 135 is displayed over the entire screen of the liquid crystal display. FIG. 11A is a diagram showing a specific example of a center display, and FIG. 11B is a diagram showing a specific example of a tile display.

When the display format is set, the CPU 110 performs a procedure to reset the readout address of the standby screen data. That is, as described above, the readout address of the standby screen data is changed from the address "A0001" of the first screen data, which is the initial setting, to the address "X0001" of the second screen data.

When this procedure ends, the process advances to step SP42, where the CPU 110 displays a procedure completion notification indicating that the procedure for setting the standby screen has been completed on the liquid crystal display. FIG. 10J is a diagram showing a screen displayed on the liquid crystal display at this time.

Thereafter, the processing of the CPU 110 returns to the main routine shown in FIG. 5. Then, in step SP1 of that diagram, the newly set second screen data is read from the SRAM 135 as a standby screen, and displayed on the liquid crystal display as a standby screen. FIG. 10K is a diagram showing the standby screen displayed at this time.

According to the embodiment described above, the mobile station 100 receives and stores site screen data from a site chosen by the user, and displays the site screen data on the liquid crystal display as a standby screen.

In the GSM (Global System for Mobile Communications) format, mobile stations include so-called SIM (Subscriber Identification Module) cards.

Figure 12:
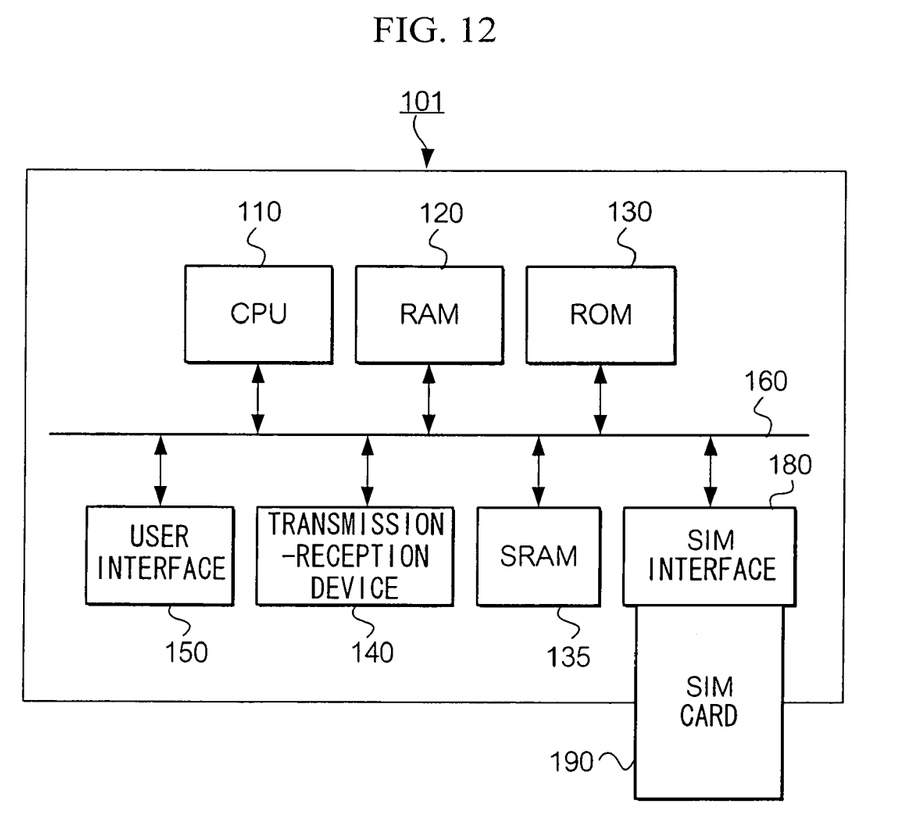
FIG. 12 is a block diagram showing the structure of a mobile station 101 and SIM card 190 in an alternate embodiment.

FIG. 12 is a block diagram showing the structure of a mobile station 101 and an SIM card 190 (memory medium) according to the GSM format. In the drawing, the constituent elements which are common to those of the mobile station 100 shown in FIG. 3 are indicated by the same reference numbers, and their explanation shall be omitted.

The mobile station 101 shown in FIG. 12 differs from that of FIG. 3 in that an SIM interface 180 (connection portion) is provided for interfacing the SIM card 190.

The SIM card 190 comprises an IC chip (not shown) embedded in an insulating synthetic resin substrate and a connecting electrode (not shown) provided on the substrate surface. The flash memory in this IC chip contains communication setting information used for performing communications through the mobile communication network. In the case of GSM, this communication setting information includes an IMSI (International Mobile Subscription identity) for identifying the mobile communication company, a PLMN (Public Land Mobile Network) selector for determining a connection order if connection is possible to a plurality of mobile communication networks, and an MSISDN (Mobile Station International ISDN Number) which is the telephone number of that mobile station and parameters necessary for performing a message service known as an SMS (Short Message Service). The CPU 110 (readout portion) of the mobile station 101 performs audio communications or data communications by reading out the communication setting information on the SIM card 190 through the SIM interface 180.

The site screen data provided by the IP server 50 can be stored in the SRAM 135 as a standby screen only if downloaded to the mobile station 101 through the mobile communication network of a specific communication company.

Figure 13:
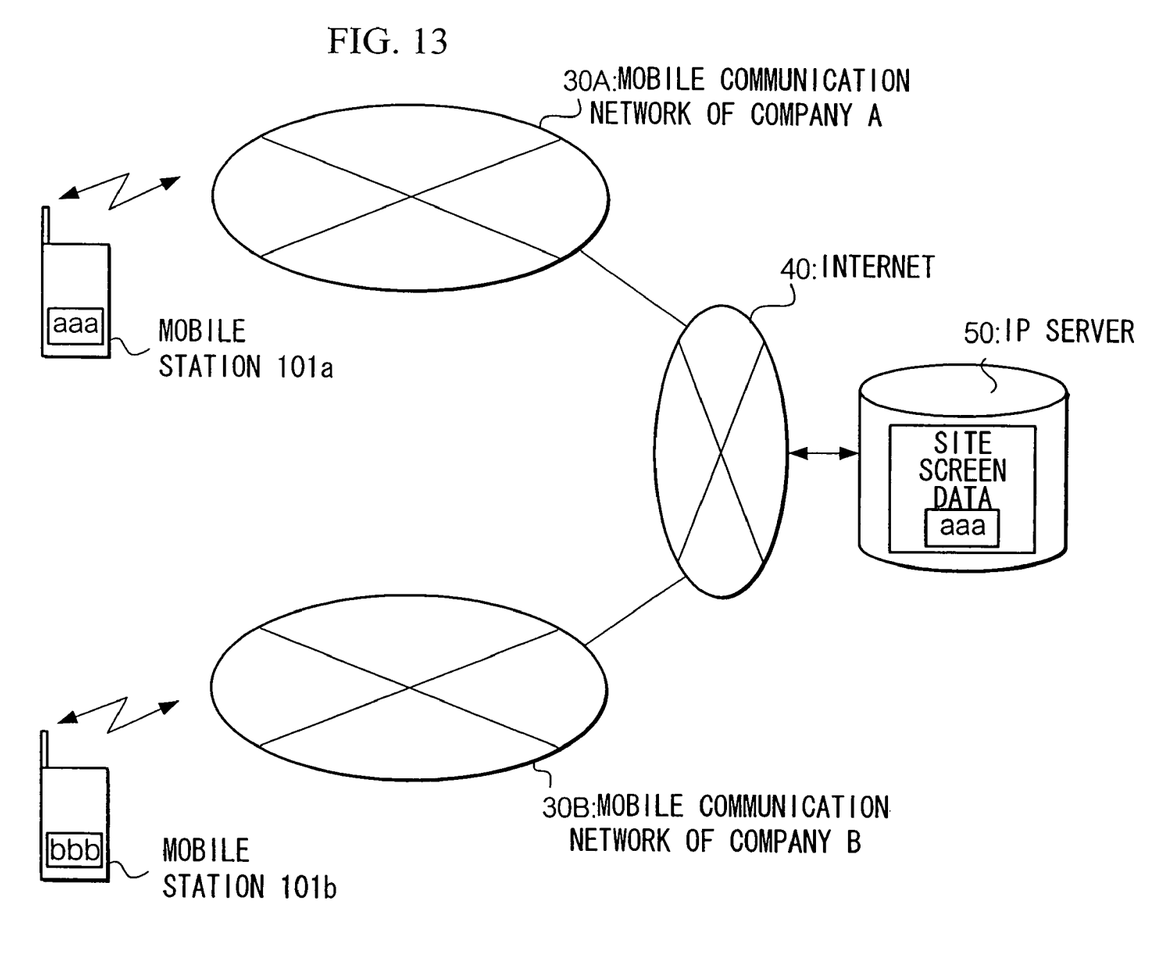
FIG. 13 is a diagram for explaining a mobile station 101 capable of storing and a mobile station 1001 incapable of storing site screen data in an alternate embodiment.

An example shall be explained with reference to FIG. 13.

In this drawing, the site screen data provided by the IP server 50 can only be stored in the SRAM 135 if downloaded through the mobile communication network 30A of the communication company A. In this case, the aforementioned site screen data contains an IMSI (e.g. "aaa") that specifies the communication company A.

An IMSI is also stored in the SIM card 190 of the mobile station 101, as mentioned above. That is, the SIM card 190 of a mobile station 101a served by the mobile communication network 30A of the communication company A stores the IMSI (aaa) of the communication company A, whereas the SIM card 190 of a mobile station 101b served by the mobile communication network 30B of the communication company B stores the IMSI (e.g. "bbb") of the communication company B. Each mobile station 111a, 101b collates the IMSI contained in the downloaded site screen data with the IMSI stored in its own SIM card 190. Each mobile station 101a, 101b stores the downloaded site screen data in the SRAM 135 if there is a match, but does not store the downloaded site screen data in the SRAM 135 if there is no match. That is, the mobile station 101a records site screen data provided by the IP server 50 as a standby screen, but the mobile station 101b, although capable of browsing the site screen data, cannot record it as a standby screen.

The criteria for determining whether or not to store site screen data are not restricted to the IMSI mentioned above. For example, one possible criterion for determination is an ICCID (ID Card Identification) which is specific to each IC card including the SIM card 190. That is, the site screen data may include ICCID's corresponding to SIM cards 190 for which permission to record the data has been granted. So that, the mobile stations 101a, 101b may collate the ICCID's contained in the downloaded site screen data with the ICCID stored in its own SIM card 190, and store the site screen data in the SRAM 135 only when there is a match.

For example, if site screen data is sent to the mobile station 101 encrypted with an encryption key corresponding to the communication company A, then a decryption key for decoding the encrypted data can be stored in the SIM card 190 which is compliant with the communication company A. The mobile station 101 may decide whether or not to record the site screen data, based on whether or not it has the decryption key for decoding the downloaded site screen data. Additionally, it is possible to make the decision as to whether or not recording is possible, based not on whether or not it has the decryption key, but instead on whether or not it in fact can decode the downloaded site screen data by the decryption key stored in the SIM card 190.

An embodiment using a SIM card 190 can be implemented not only in GSM, but also in such communication formats as IMT (International Mobile Telecommunications) 2000, DCS (Digital Communications Service) 1800 and PCS (Personal Communications Service) 1900.

In the aforementioned embodiment, the user records site screen data by selecting the menu item "(1) register display screen", and sets the recorded site screen data as a standby screen by selecting the menu item "(5) set standby screen". But, this invention is not restricted to such guiding menus.

Various other embodiments can be conceived. For instance, the site screen recording process and the standby screen setting process may be performed in response to entering of one or more predetermined key operations by the user while the site screen data is displayed, which is not yet recorded in the SRAM 135 but simply recorded temporarily in the RAM 120.

The "image data" in the present invention is not restricted only to still images but includes moving images and data which mixes moving images and still images. For example, it is possible to include moving images in the form of ordering a plurality of still images in a temporal sequence such as a GIF (Graphics Interchange Format) animation or in MPEG4 (Moving Picture Experts Group Phase 4) format.

In the above-described embodiment, the mobile station 100 displays the site screen data recorded in the SRAM 135 while the mobile station 100 is in the standby state. Other embodiments may be conceived in which the site screen data is displayed while the mobile station is in other states.

For example, when the mobile station 100 is in a state of downloading data from the IP server 50, the site screen data recorded in the SRAM 135 can be displayed as a screen indicating the state. Additionally, when the mobile station 100 is in a state of receiving an electronic mail from another mobile station, the site screen data recorded in the SRAM 135 may be displayed to indicate that mail is being received.

In the above-described embodiment, an example has been described of storing only one type of site screen data in the SRAM 135, as well as the default standby screen data. However, there is no restriction thereto. It is possible to store a plurality of types of site screen data in the SRAM 135, in addition to the default standby screen data, so as to display site screen data chosen by the user from among these. Furthermore, different site screen data may be selectively displayed for a different state among the standby state, download state and electronic mail receiving state.

A selection of data to be displayed from among the plurality of types of site screen data may not be done by the user. For example, the mobile station 100 may display a plurality of types of site screen data in periodic rotation or randomly.

In the above-described embodiment, the standby screen data is site screen data acquired from the site of the IP server 50 or the like, but there is no restriction thereto.

Figure 14:
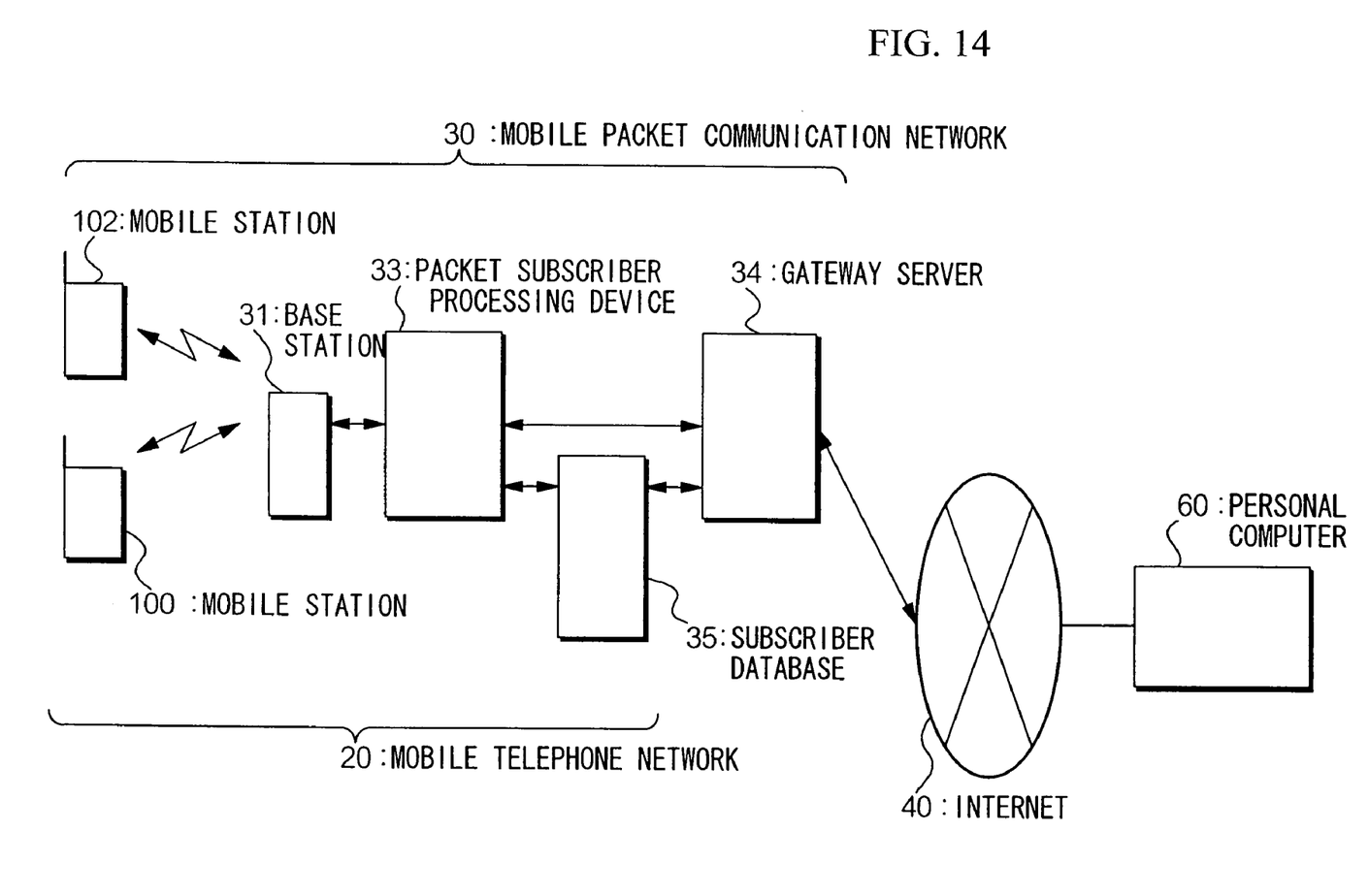
FIG. 14 is a block diagram showing the overall structure of a mobile communication system including another terminal in an alternate embodiment.

For example, image data to be used as a standby screen may be sent by e-mail to the mobile station 100 from another terminal (second terminal device) connected through the mobile communication network. The other terminal may be another mobile station 102 served by another mobile communication network, as shown in FIG. 14, or may be a personal computer connected to the Internet 40. In this case, the image data acquired through e-mail from the other terminal is processed by the mobile station 100 in the display screen registration procedure and the standby screen setting procedure just as the site screen data acquired from the above-described IP server 50 is processed. Additionally, the image data may be exchanged, using a short message service, known as SMS, instead of using an e-mail.

When transmitting image data to a mobile station 101 containing a SIM card 190 as mentioned above, the other terminal on the data transmitting side should transmit the image data with an IMSI or decryption key appended.

The non-volatile memory provided in the mobile station 100 is not restricted to being an SRAM 135 as mentioned above, and may be a flash memory or EEPROM (Electrically Erasable Programmable Read-Only Memory).

The mobile communication terminal of the present invention is not restricted to a mobile station 100 such as the aforementioned portable telephone device or PHS (Personal Handyphone System). For example, it may be a mobile communication terminal which does not have a telephone function, such as a PDA (personal Digital Assistant) specialized for a data communication function or the like.

The invention claimed is:

1. A mobile communication terminal that receives communications services from a mobile wireless network, comprising:
 a communication control that selectively implements multiple communication functionalities comprising a voice communication functionality, an electronic message communication functionality and a network browsing functionality for browsing a second network located outside the mobile wireless network, wherein while implementing the multiple communication functionalities, at least one standby state is realizable in which no user action is prompted;
 a viewer that activates the network browsing functionality to selectively access information provider servers located in the second network and receive one or more blocks of screen data from the accessed information provider servers for preview of the received one or more blocks of screen data by a user of the mobile communication terminal;

a registration control that upon a selection by the user of one block of screen data through the preview of the received one or more blocks of screen data, stores the selected one block of screen data in one of multiple memory areas each correlatable to any one of the at least one standby state;

a correlation control responsive to an instruction from the user to dynamically correlates the one of the multiple memory areas to one of the at least one standby state selected by the user; and a display control that, when the terminal is in the selected one of the at least one standby state, displays the selected one of the one or more blocks of screen data.

2. A mobile communication terminal according to claim 1, wherein one of the at least one standby state is a standby state in which the terminal is waiting for a call to come in or for the user to key in.

3. A mobile communication terminal according to claim 1, wherein one of the at least one standby state is a state of downloading data from the data source.

4. A mobile communication terminal according to claim 1, wherein the display control keeps displaying screen data until an occurrence of an event triggers a shift from the standby state.

5. A mobile communication terminal according to claim 1, wherein one of the at least one standby state is a state of receiving an e-mail.

6. A mobile communication terminal according to claim 1, wherein different screen data is selectively displayed in a standby state.

7. A mobile communication terminal according to claim 6, wherein different screen data is randomly displayed in a standby state.

8. A mobile communication terminal according to claim 6, wherein different screen data is displayed in a standby state in a periodic rotation.

9. A mobile communication terminal according to claim 1, wherein the second network is an Internet.

10. A mobile communication terminal according to claim 9, wherein the one or more blocks of screen data are received from a web page on the Internet.

11. A mobile communication terminal according to claim 1, the selected one of the one or more of the screen data is processed for display.

12. A mobile communication terminal according to claim 11, wherein the size of the image represented by the selected one of the one or more of the screen data is adjusted.

13. A mobile communication terminal according to claim 11, wherein the image represented by the selected one of the one or more of the screen data is repeated.

14. A mobile communication terminal according to claim 11, wherein the image represented by the selected one of the one or more of the screen data is placed at a designated location on a display of the terminal.

15. A mobile communication terminal according to claim 1, wherein the registration control determines, based on one or more attributes attached to the selected one of the one or more of the received screen data, whether the selected block of the received screen data is storable.

16. A mobile communication terminal according to claim 15, wherein one of the attributes is a size of the selected block of the received screen data.

17. A mobile communication terminal according to claim 15, wherein one of the attributes is copyright protection.

18. A mobile communication terminal according to claim 15, wherein one of the attributes is identification of a network through which the screen data was received.

19. A mobile communication terminal according to claim 15, wherein one of the attributes is an encryption method with which the screen data is encrypted.

20. A mobile communication terminal according to claim 15, wherein one of the attributes is a communication protocol adopted in the network.

\* \* \* \* \*

UNITED STATES PATENT AND TRADEMARK OFFICE
CERTIFICATE OF CORRECTION

| | | |
|---|---|---|
| PATENT NO. | : 7,412,223 B1 | Page 1 of 1 |
| APPLICATION NO. | : 09/720729 | |
| DATED | : August 12, 2008 | |
| INVENTOR(S) | : Masaaki Yamamoto et al. | |

It is certified that error appears in the above-identified patent and that said Letters Patent is hereby corrected as shown below:

On the Title Page

In column 1, item (86), delete "Dec. 28, 2000" and substitute --Dec. 27, 2000-- in its place.

Signed and Sealed this

Twenty-eighth Day of October, 2008

JON W. DUDAS
*Director of the United States Patent and Trademark Office*